United States Patent [19]

Schmidt et al.

[11] Patent Number: 5,798,433
[45] Date of Patent: Aug. 25, 1998

[54] PROCESS FOR PRODUCTION OF POLYPROPYLENE TEREPHTHALATE

[75] Inventors: Wolfgang Schmidt, Gelnhausen; Ulrich Thiele, Bruchkoebel; Stephanie Schauhoff, Frankfurt am Main; Dahai Yu, Bad Orb, all of Germany

[73] Assignees: Zimmer Aktiengesellschaft; Degussa Aktiengesellschaft, both of Frankfurt am Main, Germany

[21] Appl. No.: 941,997

[22] Filed: Oct. 1, 1997

[30] Foreign Application Priority Data

Feb. 12, 1997 [DE] Germany ............. 197 05 249.5

[51] Int. Cl.⁶ ................................. C08G 63/82
[52] U.S. Cl. ............ 528/279; 528/280; 528/285; 528/286; 528/302; 528/308.6; 528/503; 524/779; 524/783; 524/785; 524/789
[58] Field of Search ................. 528/279, 280, 528/285, 286, 302, 308, 308.6, 503; 524/779, 783, 785, 789

[56] References Cited

U.S. PATENT DOCUMENTS

| | | | |
|---|---|---|---|
| 3,696,171 | 10/1972 | Braunstein | 525/400 |
| 4,611,049 | 9/1986 | Kuratsuji et al. | 528/279 |
| 4,713,414 | 12/1987 | Kusumgar | 525/64 |
| 5,340,909 | 8/1994 | Doerr et al. | 528/276 |
| 5,459,229 | 10/1995 | Kelsey et al. | 528/275 |

*Primary Examiner*—Samuel A. Acquah
*Attorney, Agent, or Firm*—McDonnell Boehnen Hulbert & Berghoff

[57] ABSTRACT

The present invention provides a method of synthesizing polypropylene terephthalate with no more than 5 ppm acrolein and no more than 3 ppm allyl alcohol. The method comprises direct esterification of terephthalic acid with 1,3-propanediol in the presence of 30 to 200 ppm titanium in the form of an inorganic esterification catalyst containing at least 50 mol % $TiO_2$ precipitate, blocking the esterification catalyst after esterification by adding 10 to 100 ppm phosphorus in the form of a phosphorus-oxygen compound, and then performing precondensation and polycondensation in the presence of 100 to 300 ppm antimony in the form of a conventional antimony polycondensation catalyst and optional conventional coloring agent.

7 Claims, No Drawings

PROCESS FOR PRODUCTION OF POLYPROPYLENE TEREPHTHALATE

BACKGROUND OF INVENTION

1. Field of Invention

The present invention concerns the production of polypropylene terephthalate from terephthalic acid and 1,3-propanediol.

2. Summary of the Related Art

Because 1,3-propanediol is now commercially available on a large scale at low prices, polypropylene terephthalate is a promising plastic of the future with a long-chain zigzag molecular structure and properties mostly between those of polyethylene terephthalate and polybutylene terephthalate. Preferred applications include the entire range of fibers and moldings.

The literature describes the production of polypropylene terephthalate on the basis of dimethyl terephthalate using conventional catalysts (U.S. Pat. Nos. 2,465,319, 4,611,049 and 5,340,909, German Patent No. (OLS) 1,954,527). The only example of synthesis of polypropylene terephthalate based on terephthalic acid is described in U.S. Pat. No. 5,340,909, where 1,3-propanediol and terephthalic acid are esterified in the absence of a catalyst or in the presence of an organic titanium or tin compound followed by polycondensation in the presence of a tin catalyst.

During synthesis of polypropylene terephthalate, acrolein and allyl alcohol are necessarily formed as by-products due to thermal decomposition and are expelled in part with the polycondensation vapors (U.S. Pat. Nos. 4,611,049 and 5,459,229) and remain in part in the polymer. Both of these compounds are highly toxic (MAK [maximum allowed job site concentration] of acrolein 0.1 ppm) and are irritating to the eyes and mucous membranes.

Therefore, the object of the present invention is to minimize the acrolein and allyl alcohol content of polypropylene terephthalate. The object of this invention is in particular to provide a process that will make it possible to synthesize polypropylene terephthalate with a lower acrolein and allyl alcohol content as polymers according to the state of the art, starting from terephthalic acid.

SUMMARY OF THE INVENTION

The foregoing object is achieved according to the invention by providing a method wherein the polypropylene terephthalate contains no more than 5 ppm acrolein and no more than 3 ppm allyl alcohol and is obtained by (a) direct esterification in the presence of 30 to 200 ppm titanium in the form of an inorganic esterification catalyst containing at least 50 mol % $TiO_2$ precipitate, (b) blocking the esterification catalyst after esterification by adding 10 to 100 ppm phosphorus in the form of a phosphorus-oxygen compound, and (c) performing precondensation and polycondensation in the presence of 100 to 300 ppm antimony in the form of a conventional antimony polycondensation catalyst and optionally conventional coloring agents.

The foregoing merely summarizes the invention and is not intended, nor should it be construed as limiting the invention in any way. All patents and publications recited herein are hereby incorporated by reference in their entirety.

DETAILED DESCRIPTION OF THE PREFERRED EMBODIMENTS

The starting materials for the invention summarized above are terephthalic acid and 1,3-propanediol in the grades conventionally used for polyesters. Terephthalic acid and 1,3-propanediol may be replaced by other dicarboxylic acids and/or other diols in total amounts of up to 15 mol %. Examples include 2,6-naphthalene dicarboxylic acid, 1,4-cyclohexane dicarboxylic acid, p-hydroxybenzoic acid, 4,4'-biphenyl dicarboxylic acid, ethylene glycol, 1,2-propanediol, 1,4-butanediol, diethylene glycol, dipropylene glycol and/or 1,4-cyclohexanedimethanol.

Terephthalic acid is esterified with 1,3-propanediol in the presence of 30 to 200 ppm, preferably 50 to 100 ppm, titanium in the form of an inorganic esterification catalyst containing at least 50 mol % $TiO_2$ precipitate. According to this invention, the inorganic esterification catalyst contains titanium only in the form of $TiO_2$, but not in the form of organic titanium esters.

Hydrated titanium dioxide obtained by thermal hydrolysis of titanyl sulfate as described in European Patent Application No. 96 103 659.7 (corresponds to U.S. application Ser. No. 08/617,562) is suitable. A titanium dioxide-silicon dioxide co-precipitate with 50 to 99 mol % $TiO_2$ is especially suitable. Such co-precipitates are described in WO 95/18839 and European Patent No. 716,122 A, but are used therein exclusively as polycondensation catalysts.

A crucial factor in achieving the low acrolein and allyl alcohol content of the polypropylene terephthalate according to this invention is the inactivation or blocking of the esterification catalyst after the end of esterification and before the start of polycondensation, preferably at the start of precondensation, by adding 10 to 100 ppm, preferably 20 to 60 ppm phosphorus in the form of a phosphorus-oxygen compound such as phosphorous acid, phosphoric acid, phosphonic acid, carboxyphosphonic acid and compounds thereof. In this, the present process differs fundamentally from the processes according to the known state of the art.

Precondensation and polycondensation take place in the presence of 100 to 300 ppm, preferably 200 to 250 ppm, antimony in the form of a conventional polyester-soluble antimony polycondensation catalyst such as antimony triacetate. The polycondensation catalyst can be added simultaneously with the addition of the phosphorus compound, but it is preferably not added until immediately after conclusion of the addition of phosphorus compound, especially when polymers with an especially good transparency are desired.

Depending on the intended purpose, the polypropylene terephthalate should have a neutral, transparent bluish-white color corresponding to a CIELAB color value b* in the range of −4.0 to +4.0. In this case a coloring agent is added to the reaction mixture at any time before conclusion of polycondensation, preferably either at the start of esterification or toward the end of polycondensation. The coloring agent is preferably 20 to 60 ppm cobalt, especially 30 to 50 ppm cobalt in the form of a polyester-soluble cobalt compound such as cobalt acetate.

The temperature and pressure conditions of esterification, precondensation and polycondensation correspond to those known from the state of the art. Following melt polycondensation and granulation, solid-phase polycondensation may optionally also be performed. Conventional additives such as pigments, delustering agents, lubricants, cross-linking agents, etc., may also be added.

The following Examples are presented for illustrative purposes and are not intended, nor should they be construed, as limiting the invention in any manner. Those skilled in the art will appreciate that variations on the foregoing can be made without violating the spirit or scope of the invention.

EXAMPLES

The following Examples illustrate synthesis of polypropylene terephthalate according to the invention. The given characteristic values were determined on the polypropylene terephthalate as described below.

The intrinsic viscosities (I.V.) were determined on a solution of 0.5 g polyester in 100 mL of a mixture of phenol and 1,2-dichlorobenzene (3:2 parts by weight) at 25° C.

The COOH end group concentration was determined by photometric titration of a solution of the polyester in a mixture of o-cresol and chloroform (70:30 parts by weight) against bromthymol blue using 0.05N ethanolic potassium hydroxide solution.

The CIELAB color values were measured on polyester pellets that were crystallized for one hour at 150±5° C. in a drying cabinet. The color values were determined by measuring the color of the polyester sample with three photocells, with a red filter, a blue filter or a green filter in front of each in a tristimulus colorimeter (X, Y and Z values). The results were analyzed according to CIELAB using the following equation:

$$b^* = 200 \cdot \left( \sqrt[3]{\frac{Y}{100}} - \sqrt[3]{\frac{Z}{118.22}} \right)$$

The amount of free acrolein and allyl alcohol physically dissolved in the polyester was determined as follows: the polyester to be analyzed was ground after cooling with liquid nitrogen and the screen fraction smaller than 0.4 mm was used for the analysis. 2.0 g of the polyester sample to be determined were placed in a 20 mL bottle with a septum, the bottle was sealed and kept at 170° C. for 60 minutes. A sample was taken from the gas space of the bottle through the septum and the acrolein and allyl alcohol contents were determined by gas chromatography.

Comparative Examples 1 through 4 and Examples 5 through 7

One part by weight terephthalic acid was combined with the amounts (parts by weight) of 1,3-propanediol (1,3-PD) listed in the table to form a paste and then added together with the esterification catalyst and optional cobalt acetate tetrahydrate coloring agent to an esterification product from a prior similar batch. In comparative examples 3 and 4, the polycondensation catalyst was also added. The mixture was esterified until there was a definite reduction in the amount of reaction water generated (degree of esterification at least 98.8%).

In comparative examples 1, 3 and 4, precondensation was initiated immediately after conclusion of esterification, while in comparative example 2 the polycondensation catalyst was added before precondensation. In examples 5 through 7, phosphoric acid was added first to the reaction mixture after conclusion of esterification and then before the start of precondensation, the polycondensation catalyst was added. Only about 150 ppm antimony were added here in example 7 and the remaining approx. 100 ppm were added at a much later time.

After approximately 40 minutes of precondensation at a pressure of 100 to 50 mbar (abs.), polycondensation (PC) was initiated by lowering the vacuum to less than 1 mbar. The polycondensation temperature was 257° to 265° C., except in comparative examples 2 and 3 where the temperature was approx. 270° C., or 260° to 270° C. The polycondensation time listed in the table corresponds to the maximum possible viscosity of the polymer under the given conditions, i.e., if polycondensation were continued beyond this the intrinsic viscosity (I.V.) of the polymer would decrease again due to the predominance of decomposition reactions.

The other conditions and the quality values of the resulting polypropylene terephthalate are summarized in the table below.

| Example no. | 1,3-propane diol parts by weight | Esterification catalyst Type | Esterification catalyst ppm Ti | Coloring agent ppm Co | $H_3PO_4$ ppm P | PC catalyst Type | PC catalyst ppm Sb or Ti | PC time min. | Polypropylene terephthalate Intrin visc. dL/g | COOH meq/kg | Acrolein ppm | Allyl alcohol ppm | Color value $b^*$ |
|---|---|---|---|---|---|---|---|---|---|---|---|---|---|
| 1 | 0.567 | $TiO_2$:$SiO_2$ | 50 | — | — | — | — | 171 | 0.926 | 14 | 10 | 1.7 | 10.4 |
| 2 | 0.641 | $TiO_2$ | 150 | — | — | $TiO_2$ | 130 | 120 | 0.802 | 23 | >10 | — | 3.2 |
| 3 | 0.656 | Ti(OBu)$_4$ | 75 | — | — | SbAc$_3$ | 200 | 67 | 0.890 | 10 | 40 | 3.8 | 10.7 |
| 4 | 0.567 | $TiO_2$:$SiO_2$ | 50 | — | — | SbAc$_3$ | 200 | 113 | 0.918 | 14 | 11 | 1.4 | 8.8 |
| 5 | 0.567 | $TiO_2$:$SiO_2$ | 50 | 20 | 40 | SbAc$_3$ | 200 | 163 | 0.919 | 17 | 5 | 1.7 | 5.9 |
| 6 | 0.567 | $TiO_2$:$SiO_2$ | 50 | 40 | 40 | SbAc$_3$ | 250 | 162 | 0.912 | 19 | 4 | 2.0 | −0.5 |
| 7 | 0.567 | $TiO_2$:$SiO_2$ | 50 | 40 | 60 | SbAc$_3$ | 250 | 153 | 0.635 | 16 | 3 | 2.4 | −1.2 |

$TiO_2$:$SiO_2$ = titanium dioxide-silicon dioxide coprecipitate with 80 mol % $TiO_2$, supplied by Akzo (Germany)
$TiO_2$ = hydrated titanium dioxide with approx. 2 wt % sodium and approx. 6 wt % water, supplied by Sachtleben Chemie (Germany)
Ti(OBu)$_4$ = titanium tetrabutylate
SbAc$_3$ = antimony triacetate As this table shows, titanium tetrabutylate (comparative example 3) leads to yellowish discolored products with a high acrolein and allyl alcohol content. In addition, the esterification takes longer than when using the titanium dioxide precipitate catalysts according to this invention. Of the catalysts according to this invention, the titanium dioxide-silicon dioxide coprecipitate has a higher catalytic activity but leads to a greater discoloration of the polymer (in the absence of coloring agent) than the pure titanium dioxide precipitate (comparative example 2). However, the discoloration can be corrected by adding a suitable amount of a coloring agent, thus making it possible to produce polyesters with $b^*$ color values of less than +0.5 with no problem (examples 6 and 7).

The allyl alcohol content that can be achieved with the esterification catalysts according to this invention without inactivating the catalyst before polycondensation is satisfactory, regardless of the type of polycondensation catalyst, while the acrolein content is lower than when using titanium tetrabutylate, but is still quite high at a minimum of 10 ppm acrolein (comparative examples 1, 2 and 4). To obtain polypropylene terephthalate with no more than 5 ppm acrolein, the esterification catalyst based on $TiO_2$ according to this invention must be blocked completely before polycondensation by adding a phosphorus-oxygen compound (Example 5 in comparison with comparative example 4) and the polycondensation catalyst must be free of titanium.

We claim:

1. A method for synthesizing polypropylene terephthalate containing no more than 5 ppm acrolein and no more than 3 ppm allyl alcohol comprising
   a) esterification of terephthalic acid with 1,3-propanediol in the presence of 30 to 200 ppm titanium in the form of an inorganic esterification catalyst containing at least 50 mol % $TiO_2$ precipitate,
   b) blocking the esterification catalyst after esterification by adding 10 to 100 ppm phosphorus in the form of a phosphorus-oxygen compound, and
   c) subsequent precondensation and polycondensation in the presence of 100 to 300 ppm antimony in the form of a conventional antimony polycondensation catalyst and optionally adding one or more coloring agents.

2. The method according to claim 1, wherein the coloring agents consist of 20 to 60 ppm cobalt in the form of a polyester-soluble cobalt compound.

3. The method according to claim 1, wherein the polycondensation catalyst is added after conclusion of the addition of the phosphorus compound.

4. The method according to claim 1, wherein the esterification catalyst is a hydrated titanium dioxide obtained by thermal hydrolysis of titanyl sulfate.

5. The method according to claim 1, wherein the esterification catalyst is a titanium dioxide-silicon dioxide coprecipitate with 50 to 99 mol % $TiO_2$.

6. The method according to claim 1, wherein the polypropylene terephthalate is a copolyester with a total of up to 15 mol % other dicarboxylic acids, diols, or both.

7. Polypropylene terephthalate comprising no more than 5 ppm acrolein and no more than 3 ppm allyl alcohol.

* * * * *